(12) United States Patent
Wyatt et al.

(10) Patent No.: US 7,940,196 B2
(45) Date of Patent: May 10, 2011

(54) SYSTEM AND METHOD FOR INDICATING THE FIELD OF VIEW OF A THREE DIMENSIONAL DISPLAY ON A TWO DIMENSIONAL DISPLAY

(75) Inventors: Ivan S. Wyatt, Scottsdale, AZ (US);
Gang He, Morristown, NJ (US); Thea L. Feyereisen, Hudson, WI (US); Jary E. Engels, Peoria, AZ (US); Aaron J. Gannon, Anthem, AZ (US)

(73) Assignee: Honeywell International Inc., Morristown, NJ (US)

( * ) Notice: Subject to any disclaimer, the term of this patent is extended or adjusted under 35 U.S.C. 154(b) by 792 days.

(21) Appl. No.: 11/690,008

(22) Filed: Mar. 22, 2007

(65) Prior Publication Data
US 2008/0231473 A1 Sep. 25, 2008

(51) Int. Cl.
*G01C 23/00* (2006.01)

(52) U.S. Cl. .................. 340/973; 340/979; 340/980

(58) Field of Classification Search .................. 340/970, 340/971, 973, 980, 968, 967, 961, 963, 979; 345/421, 427; 701/207, 213, 3
See application file for complete search history.

(56) References Cited

U.S. PATENT DOCUMENTS

| 4,682,160 | A * | 7/1987 | Beckwith et al. | 345/421 |
|---|---|---|---|---|
| 4,702,698 | A * | 10/1987 | Beckwith et al. | 434/2 |
| 6,889,124 | B2 * | 5/2005 | Block et al. | 701/9 |
| 7,010,398 | B2 * | 3/2006 | Wilkins et al. | 701/3 |
| 7,098,809 | B2 * | 8/2006 | Feyereisen et al. | 340/963 |

* cited by examiner

*Primary Examiner* — Van T. Trieu
(74) *Attorney, Agent, or Firm* — Ingrassia Fisher & Lorenz, P.C.

(57) ABSTRACT

An aircraft display system is provided that is configured to render a perspective display having a field of view. The aircraft display system includes a monitor and a processor coupled to the monitor. The processor is configured to generate a map display on the monitor. The map display indicates the value of at least one parameter of the field of view of the perspective display.

15 Claims, 5 Drawing Sheets

US 7,940,196 B2

SYSTEM AND METHOD FOR INDICATING THE FIELD OF VIEW OF A THREE DIMENSIONAL DISPLAY ON A TWO DIMENSIONAL DISPLAY

FIELD OF THE INVENTION

The present invention relates generally to vehicular display systems, and, more particularly, to an aircraft display system and method for indicating a three dimensional (e.g., perspective) display's field of view on a two dimensional (e.g., moving map) display.

BACKGROUND OF THE INVENTION

Aircraft display systems are capable of providing an observer (e.g., a pilot) with a considerable amount of information relating to the aircraft's position, flight plan, and surrounding environment (e.g., nearby geographical features, such as airports and mountains). An aircraft display system typically includes at least one monitor, which may be, for example, a head down display (HDD) screen. A processor utilizes information received from a variety of data sources to generate multiple displays on the monitor. These displays typically include a two dimensional moving map display and may include a three dimensional perspective display. The moving map display may include a top-down view of the aircraft, the flight plan, and the surrounding environment. Various symbols are utilized to denote navigational cues (e.g., waypoint symbols, line segments interconnecting the waypoint symbols, range rings) and nearby environmental features (e.g., terrain, weather conditions, political boundaries, etc). By comparison, the perspective display is a forward-looking view, which may be somewhat similar to the view from the cockpit on a clear day. Like the moving map display, the perspective display may include various navigational cues (e.g., graphics indicating the heading, track, and attitude of the aircraft). However, unlike the moving map display, the perspective display indicates geographical features as rendered or "synthetic" terrain.

The moving map display and the perspective display each provide a pilot (or other observer) with important navigational information. For example, the moving map display permits a pilot to easily determine the aircraft's location with reference to geographical landmarks, including significant geographical features (e.g., ridges, mountain ranges, valleys, etc.) and man-made structures (e.g., airports). Consequently, a pilot may refer to the moving map display when guiding an aircraft to a particular destination. The perspective display, by comparison, provides information regarding the aircraft's orientation (e.g., the aircraft's attitude, altitude, pitch, roll, etc.) and aspects of nearby geographical features in an intuitive manner. Thus, a pilot may refer to the perspective display when navigating around a geographical feature, such as a mountain.

The moving map display and perspective display may be produced one or more monitors. For example, the moving map display and perspective display may be produced simultaneously on a single screen in a split-screen or picture-in-picture format. However, even when the displays are produced simultaneously on a single monitor, an observer may have difficulty correlating (i.e., associating) the information provided by the moving map display and with that provided by the perspective display. In particular, the observer may be unable to determine which portion of the moving map display is shown in the perspective display because conventional display systems do not indicate the perspective display's field of view (FOV) on the moving map display.

Considering the foregoing, it would be desirable to provide an aircraft display system and method for indicating one or more parameters of the perspective display's FOV on a moving map display in an intuitive and readily-comprehendible manner. It would further be desirable if the system and method were further able to incorporate additional aircraft parameters into the FOV determination for display on the moving map, such as the aircraft's roll angle and/or pitch angle. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

An aircraft display system is provided that is configured to render a perspective display having a field of view. The aircraft display system includes a monitor and a processor coupled to the monitor. The processor is configured to generate a map display on the monitor. The map display indicates the value of at least one parameter of the field of view.

A method is also provided for correlating a map display with a perspective display having a field of view. The method includes the step of generating on the map display a graphic indicative of a first parameter of the field of view.

BRIEF DESCRIPTION OF THE DRAWINGS

The present invention will hereinafter be described in conjunction with the following drawing figures, wherein like numerals denote like elements, and.

DETAILED DESCRIPTION OF AT LEAST ONE EXEMPLARY EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
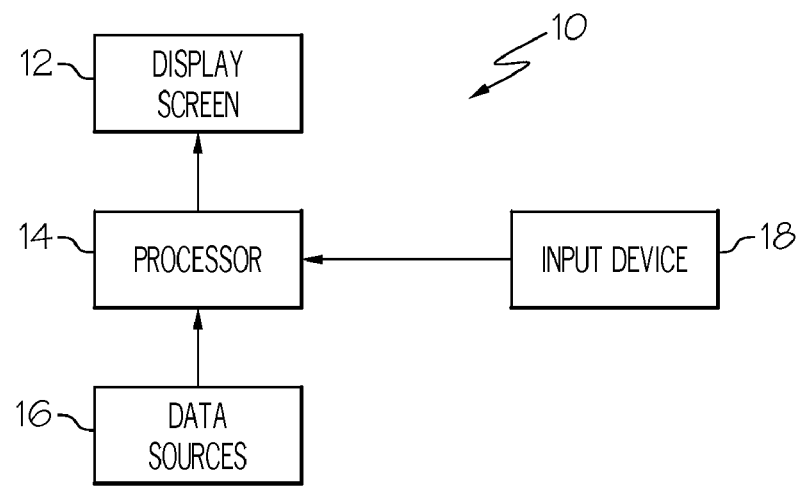
FIG. 1 is a block diagram of an aircraft display system in accordance with an exemplary embodiment of the present invention.

FIG. 1 is a functional block diagram of a generalized avionics display system 10. Display system 10 includes at least one monitor 12, a processor 14, and data sources 16. In certain embodiments, display system 10 may also include a user input 18, such as a keyboard and/or a cursor control device (e.g., a trackball). Processor 14 includes at least first and second inputs, which are operatively coupled to data sources 16 and input device 18, respectively. Processor 14 further includes at least one output, which is operatively coupled to monitor 12. Monitor 12 may comprise any suitable image-generating device including various analog devices (e.g., cathode ray tube) and digital devices (e.g., liquid crystal, active matrix, plasma, etc.). Processor 14 may comprise, or be associated with, any suitable number of individual microprocessors, flight control computers, navigational equipment, memories, power supplies, storage devices, interface cards, and other standard components known in the art. In this respect, the processor 14 may include or cooperate with any number of software programs (e.g., avionics display programs) or instructions designed to carry out the various methods, process tasks, calculations, and control/display functions described below.

Data sources 16 provide static and/or real-time information to processor 14, which processor 14 utilizes to generate one or more displays on monitor 12. Data sources 16 may include a wide variety of informational systems, which may reside onboard the aircraft or at a remote location. By way of example, data sources 16 may include one or more of the following systems: a runaway awareness and advisory system, an instrument landing system, a flight director system, a weather data system, a terrain avoidance and warning system, a traffic and collision avoidance system, a terrain database, and a navigational database. Data sources 16 may also include mode, position, and/or detection elements (e.g., gyroscopes, global positioning systems, inertial reference systems, etc.) capable of determining the mode and/or position of the aircraft relative to one or more reference locations, points, planes, or navigation aids.

Figure 2:
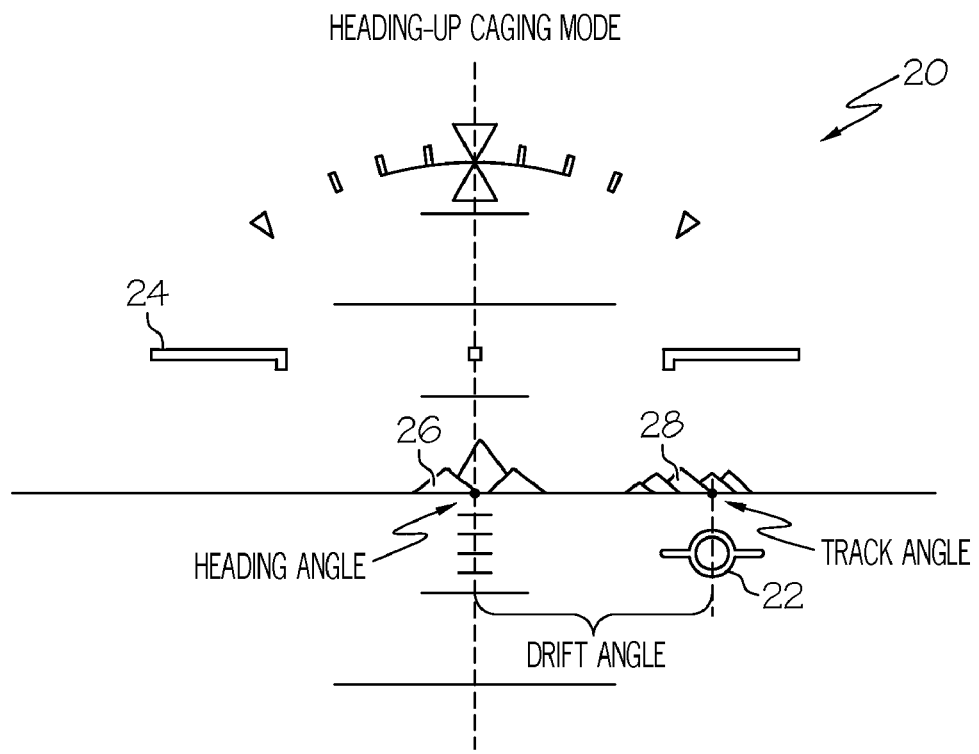
FIGS. 2, 3, and 4 illustrate a conventional perspective display in a heading-up caging mode, a track-up caging mode, and a hybrid caging mode, respectively.

FIG. 2 illustrates an exemplary perspective display 20 that processor 14 may generate on monitor 12. Perspective display 20 is shown in a "heading-up caging mode" in which display 20 is referenced (e.g., centered) with respect to the heading (or heading angle) of the aircraft (i.e., the direction in which the aircraft nose is pointed). The track of the aircraft (i.e., the direction in which the aircraft is actually traveling) is indicated by flight path symbol 22. As indicated in FIG. 2, there often exists a difference, or drift, between the aircraft's heading and track due to external forces, such as strong cross winds, acting on the aircraft. Perspective display 20 further includes an attitude symbol 24, which may assume the form of two horizontal marks representing the aircraft wings. Attitude symbol 24 indicates the aircraft's attitude with respect to the heading angle. A pilot may refer to attitude symbol 24 to determine the pitch angle of the aircraft (i.e., the angle of the aircraft's longitudinal axis with respect to the local level) and the roll angle of the aircraft (the angle of the aircraft's lateral axis of the aircraft with respect to the local level). Geographical features (e.g., terrain) appearing on perspective display 20 are shown as three dimensional rendered or "synthetic" objects. In the illustrated exemplary embodiment, two terrain features are shown, namely first and second mountain ranges 26 and 28. By referring to perspective display 20, a pilot may readily determine the height of and the position of mountain ranges 26 and 28 (and other such geographical features) relative to the aircraft's position, heading, and track.

Figure 3:
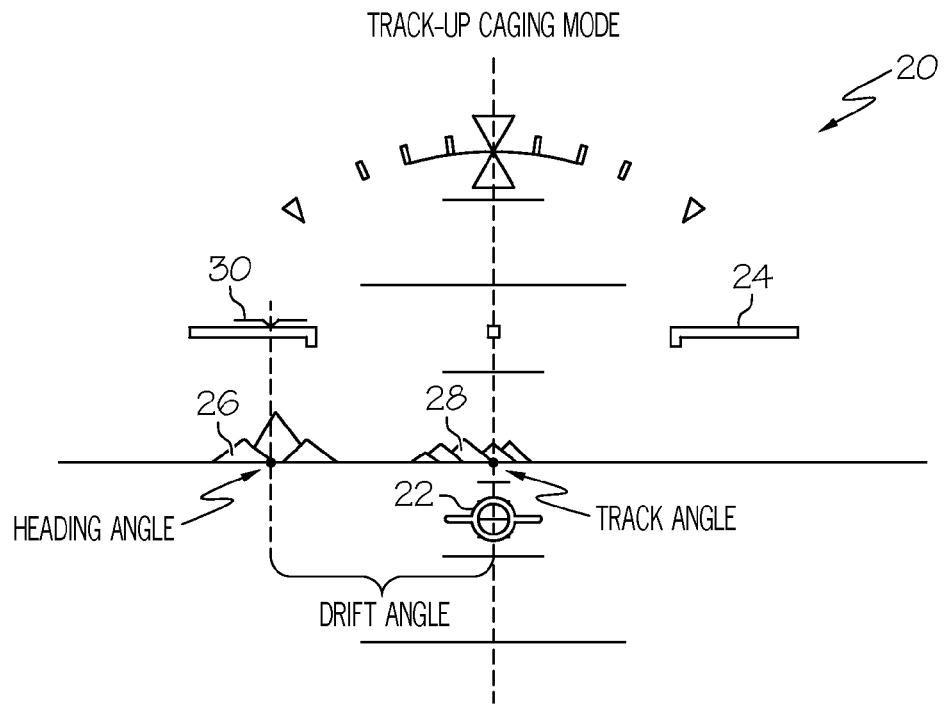
Figure 4:
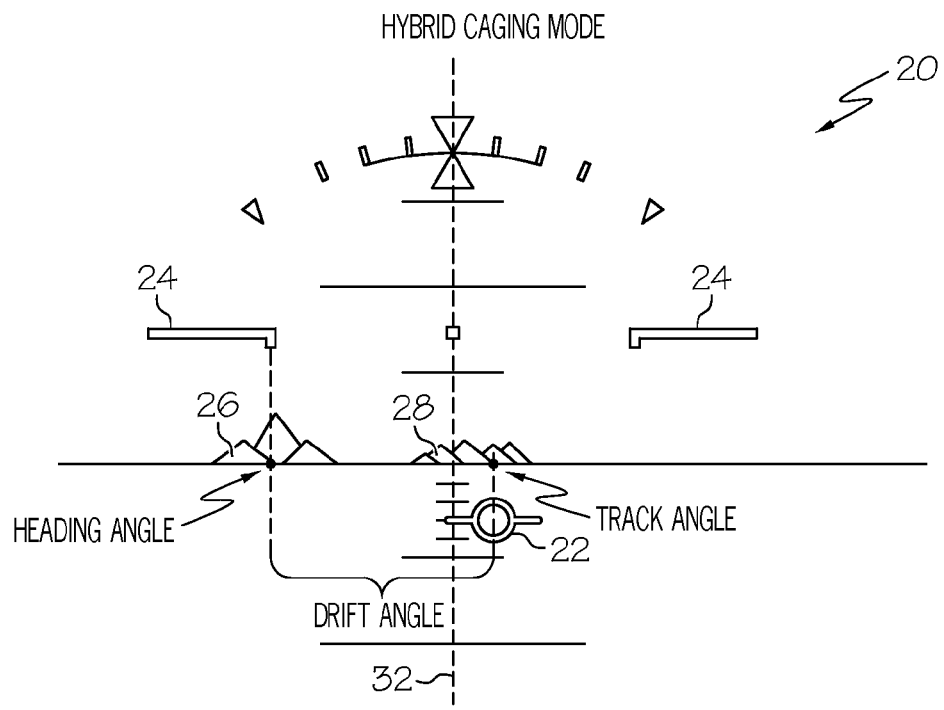

Of course, the heading-up caging mode shown in FIG. 2 is only one of many different modes that may be assumed by perspective display 20. Perspective display 20 may also assume, for example, a "track-up caging mode" of type shown in FIG. 3. In such a "track-up caging mode," display 20 is referenced (e.g., centered) with respect to the aircraft's Flight Path Symbol (e.g., centered on the display's practical center). In such a case, the aircraft's heading may be indicated by a heading symbol 30. Alternatively, as shown in FIG. 4, perspective display 20 may assume a "hybrid caging mode" wherein perspective display is referenced (e.g., centered) with respect to a centerline 32, which is relative to the aircraft's track and aircraft's heading. As will be appreciated by one skilled in the art, the location of centerline 32 may be determined as a function of aircraft track, aircraft heading, and other operational characteristics of the aircraft.

In addition to perspective display 20, processor 14 (FIG. 1) may also generate a two dimensional moving map display on monitor 12. Processor 14 preferably generates the perspective display and the moving map display simultaneously on monitor 12, although this may not always be the case. For example, the perspective display (e.g., display 20) may be displayed in a first window, which may occupy a majority of monitor 12 (e.g., two thirds of the monitor), and the map display may be displayed in a second, smaller window. Alternatively, the perspective display may occupy the entirety of monitor 12 and the moving map display may be produced in a small window superimposed over a portion of the perspective display (commonly referred to as a picture-in-picture format).

Figure 5:
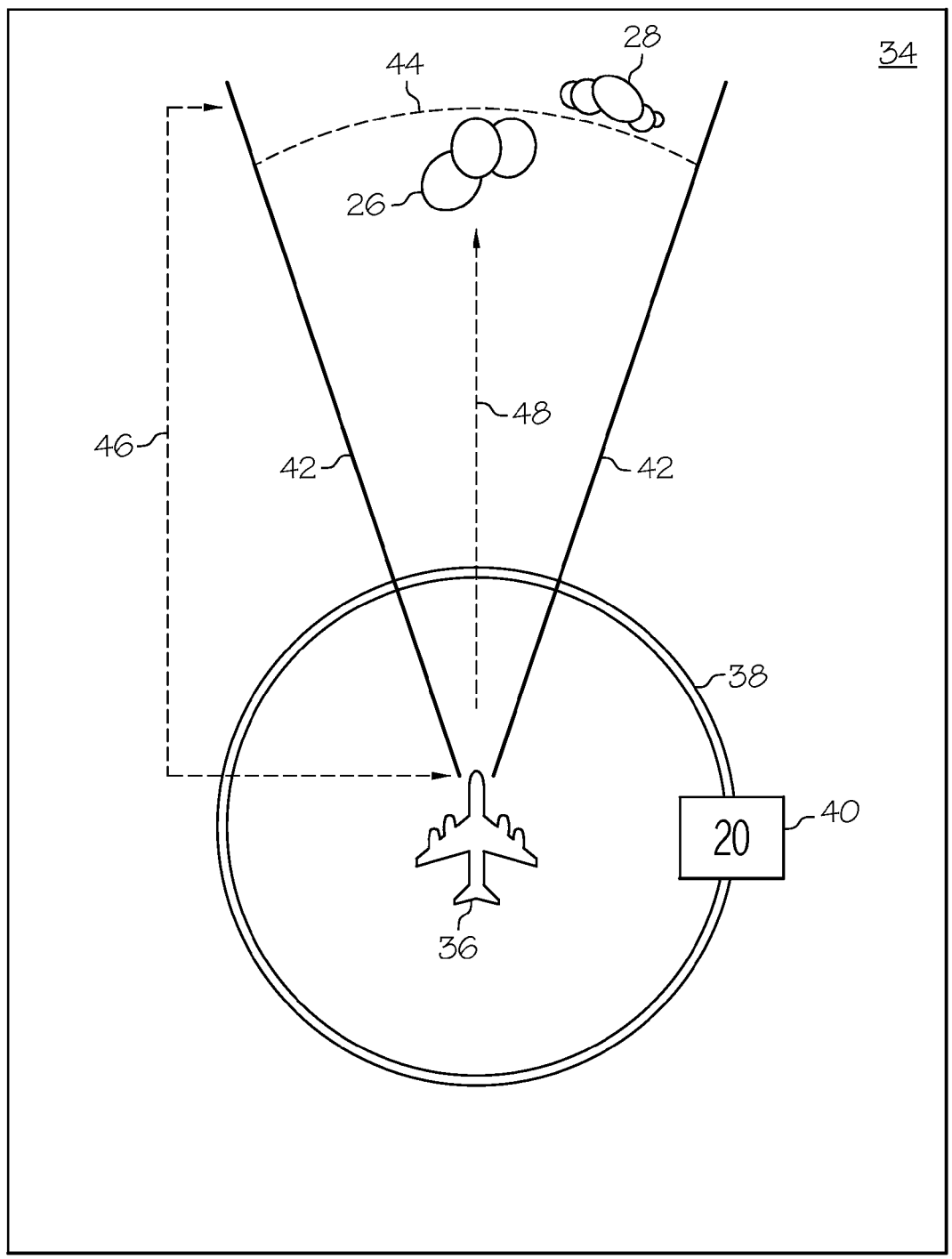
FIGS. 5, 6, and 7 illustrate a moving map display corresponding to the perspective display shown in FIGS. 2, 3, and 4, respectively, in accordance with an exemplary embodiment of the present invention.

FIG. 5 illustrates a moving map display 34 in accordance with an exemplary embodiment of the present invention. For illustrative purposes, moving map display 34 is illustrated as generally corresponding perspective display 20 shown in FIG. 2. Thus, moving map display 34 includes terrain symbology indicating the location of mountain ranges 26 and 28 relative to the location of the aircraft, which may be represented by a top-down aircraft symbol 36. To provide the pilot with a sense of distance, map display 34 includes at least one range ring 38, which is centered about aircraft symbol 36 and which has a predetermined radius (e.g., 20 nautical miles). A range indicator 40 may display the radius of range ring 38, which may be set automatically or manually via a non-illustrated selection means (e.g., a pop-up menu).

As does perspective display 20 (FIGS. 2-4), moving map display 34 provides a pilot (or other observer) with valuable information regarding the aircraft's position, flight plan, and surrounding environment. However, as explained previously, it may be difficult for a pilot to determine the field of view (FOV) of perspective display 20 with reference to a conventional moving map display. To permit a pilot to more easily correlate perspective display 20 with moving map display 34, processor 14 is configured to generate at least one symbol or graphic on moving map display 34 indicative of the value of one or more parameters of the perspective display FOV. These parameters may include, but are not limited to, the FOV angle and/or of the FOV range. In the illustrated exemplary embodiment, processor 14 produces first and second wedges lines 42 on moving map display 34, which indicate the lateral boundaries of the perspective display FOV. As can be seen in FIG. 5, wedge lines 42 converge toward the cockpit, and thus the pilot's viewpoint. In so doing, wedges lines 42 form an angle 44 that substantially corresponds to the FOV angle. In addition, the length of wedge lines 42 may indicate FOV range 46. For example, if FOV range 46 were reduced (e.g., partially block) by nearby terrain, the length of wedge lines 42 may be shortened accordingly. This example notwithstanding, it should be understood that alternative embodiments of the avionics display system may be configured to produce other graphics (e.g., a numerical indicator similar to range indicator 40) on moving map display 34 indicative of the FOV angle and/or the FOV range.

Wedge lines 42 may be oriented (e.g., centered) with respect to a centerline 48. The position of centerline 48 is determined in relation to the selected caging mode. For example, if a "heading-up caging mode" is selected, centerline 48 will align with the aircraft heading. This may be appreciated by referring to FIG. 5, which illustrates moving map display 34 in a "heading-up caging mode" generally corresponding to perspective display 20 as shown in FIG. 2. If, instead, a "track-up caging mode" is selected, centerline 48 will align with the aircraft track. This may be appreciated by referring to FIG. 6, which illustrates moving map display 34 in a "track-up caging mode" corresponding to perspective display 20 as shown in FIG. 3. As a final example, if a "hybrid caging mode" is selected, centerline 48 will align between the aircraft heading and the aircraft track. This may be appreciated by referring to FIG. 7, which illustrates moving map display 34 in a "hybrid caging mode" corresponding to perspective display 20 shown in FIG. 4.

In certain embodiments of aircraft display system 10 (FIG. 1), the FOV angle and/or the FOV range may be variable. For example, aircraft display system 10 may be configured such that a pilot may utilize input device 18 to alter the FOV angle. For example, the pilot may utilize input device 18 to select a narrower FOV angle (e.g., 38 degrees) when precision maneuvering is required (e.g., during landing). When precision maneuvering is not required, the pilot may utilize input device 18 to select a relatively wide FOV angle (e.g., 50 degrees or more) to augment situational awareness. Processor 14 may be configured to alter the appearance (i.e., the angle and/or length) of wedge lines 42 to reflect any changes made to parameters (angle and/or range) of the perspective display FOV.

Figure 6:
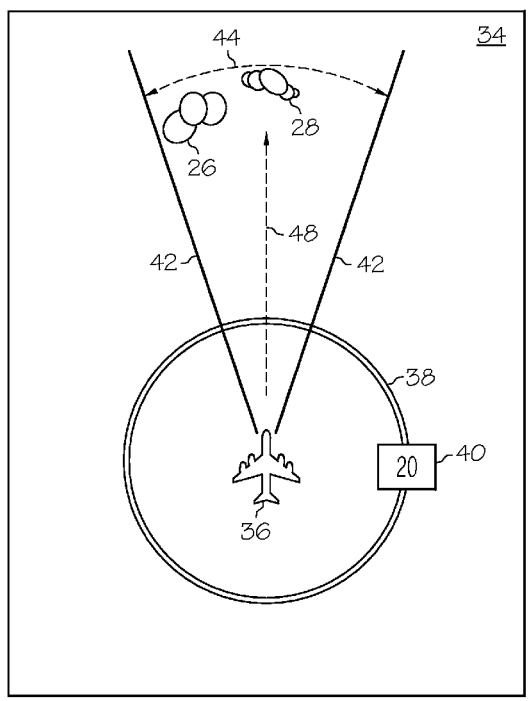
Figure 7:
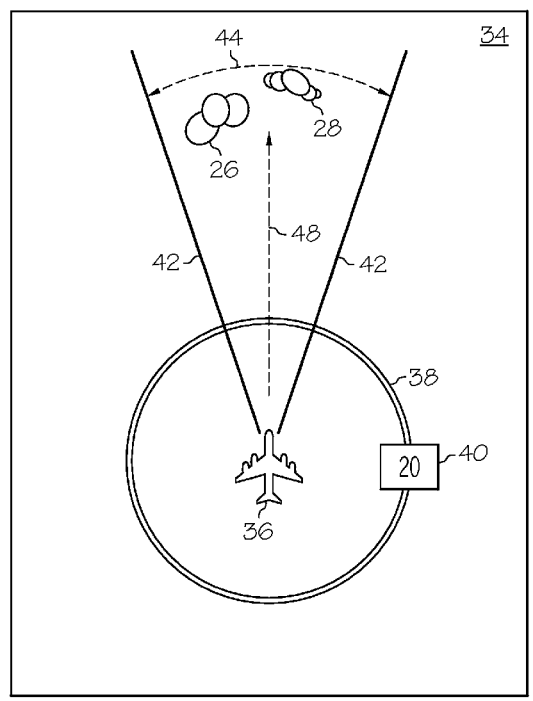
Figure 8:
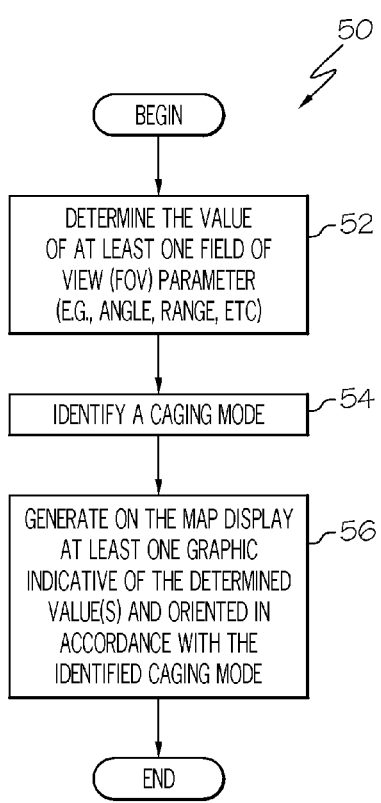
FIG. 8 is a flowchart illustrating a process that may be performed by the processor shown in FIG. 1 in generating a graphic on the map display shown in FIGS. 5-7 indicative of a field of view parameter.

FIG. 8 is a flowchart illustrating a process 50 that that may be performed by processor 14 (FIG. 1) in generating wedge lines 42 (or other such graphic) on moving map display 34 (FIGS. 5-7). After initialization of process 50, processor 14 determines the value of at least one parameter of the perspective display's field of view (STEP 52). For example, processor 14 may determine the FOV angle and/or the FOV range of perspective display 34 (FIGS. 5-7). Next, at STEP 54, processor 14 identifies the caging mode, which may be, for example, a heading-up caging mode (FIG. 5), a track-up caging mode (FIG. 6), or a hybrid caging mode (FIG. 7). The caging mode may be fixed or manually selected by the pilot. Finally, at STEP 56, processor 14 generates on map display 34 at least one graphic, which indicates the determined value of the field of view parameter and which is oriented in accordance with the identified caging mode. For example, processor 14 may generate wedge lines 42 on display 34, which may indicate the FOV angle and/or the FOV range in the manner described above. Processor 14 may repeat process 50 to detect any changes to the value of the FOV parameter and modify the appearance of the graphic (e.g., wedge lines 42) accordingly.

Figure 9:
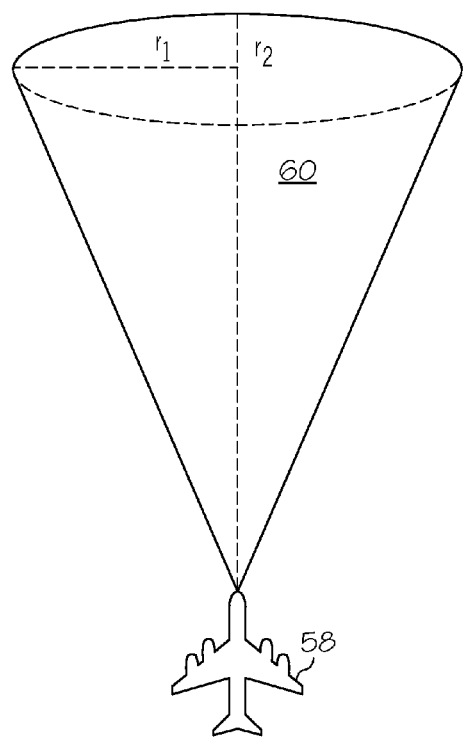
FIG. 9 is a top view of an aircraft illustrating an exemplary conical volume of space that may be rendered in the perspective display shown in FIGS. 2-4.

Wedge lines 42 (or other similar graphics) may also be affected by the roll angle and/or pitch angle of the aircraft when, for example, the perspective display FOV may be characterized by an elliptical cone. This point is illustrated in FIG. 9, which is a top view of an aircraft 58 illustrating an exemplary conical volume of space 60 that may be rendered in to produce perspective display 20 shown in FIGS. 2-4. As can bee seen, the base of cone 60 has first and second radii $R_1$ and $R_2$. When $R_1$ is equal to $R_2$ (that is, when the FOV may be characterized by a circular cone), wedge lines 42 will remain stationary as the aircraft rolls (e.g., banks) in either direction. However, when $R_1$ is greater than or less than $R_2$, wedge lines 42 will reflect the roll angle of the aircraft. In particular, when $R_1$ is greater than $R_2$, wedge lines 42 will move toward one another to reflect a decrease FOV angle as seen from a top-down view (i.e., the spread of wedge lines 42 will decrease). Conversely, when $R_2$ is less than $R_1$, wedge lines 42 will move away from one another to reflect an increase in the FOV angle as seen from a top-down view (i.e., the spread of wedge lines 42 will increase). In addition, the length of wedge lines 42 may be varied to indicate a change in the pitch angle of the aircraft.

It should thus be appreciated that there has been provided an aircraft display system and method for indicating at least one parameter of a perspective display FOV on a two dimensional (e.g., moving map) display in an intuitive and readily-comprehendible manner. It should further be appreciated that, in certain embodiments, the system and method are capable of including the aircraft's roll angle and/or pitch angle in the FOV determination for display on the moving map. While an exemplary embodiment of the present invention has been described above in the context of a fully functioning computer system (i.e., avionics display system 10), those skilled in the art will recognize that the mechanisms of the present invention are capable of being distributed as a program product (i.e., an avionics display program) and, furthermore, that the teachings of the present invention apply to the program product regardless of the particular type of computer-readable media (e.g., floppy disc, hard drive, memory card, optical disc, etc.) employed to carry-out its distribution.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft display system configured to render a perspective display having a field of view, comprising:
   a monitor; and
   a processor coupled to said monitor and configured to generate a map display on said monitor, the processor further generating wedges lines on the map display visually representing the lateral boundaries of the field of view of the perspective display.

2. An aircraft display system according to claim 1 wherein the wedge lines converge toward the pilot's viewpoint to indicate the angle of the field of view of the perspective display.

3. An aircraft display system according to claim 1 wherein the length of the wedge lines indicates the range of the field of view.

4. An aircraft display system according to claim 1 wherein the map display and the perspective display are each produced on said monitor.

5. An aircraft display system according to claim 4 wherein the map display and the perspective display are produced simultaneously.

6. An aircraft display system according to claim 1 wherein the wedge lines are centered with respect to aircraft track.

7. An aircraft display system according to claim 1 wherein the wedge lines are centered with respect to aircraft heading.

8. An aircraft display system according to claim 1 wherein the wedge lines are centered as a function of aircraft track and heading.

9. An aircraft display system according to claim 1 wherein the spread of the wedge lines is indicative of the roll angle of the aircraft.

10. An aircraft display system according to claim 1 wherein the length of the wedge lines is indicative of the pitch angle of the aircraft.

11. A method for correlating a map display with a perspective display having a field of view, the method carried-out by an aircraft display system, the method comprising:
   generating on the map display a graphic indicative of the angle of the field of view of the perspective display;
   wherein the graphic generated on the map display comprises wedge lines visually representing the lateral boundaries of the field of view of the perspective display.

12. A method according to claim 11 further comprising:
   generating on the map display a graphic indicative of the range of the field of view.

13. A method according to claim 11 wherein the step of generating comprises:
   establishing a caging mode; and
   orienting the graphic in accordance with the established caging mode.

14. A method according to claim 11 further comprising:
   detecting a change in the angle of the field of view; and
   modifying the graphic to reflect the change in the angle of the field of view.

15. A program product executable by an aircraft display system including at least one monitor and a processor, the program product comprising:
   an avionics display program adapted to:
      generate a map display and a perspective display having a field of view on the at least one monitor;
      determine in the processor the value of the angle of the field of view of the perspective display; and
      produce a graphic on the at least one monitor and included in the map display indicative of the determine value of the angle of the field of view of the perspective display; and
   computer-readable media bearing said avionics display program;
   wherein the graphic generated on the map display comprises wedge lines visually representing the lateral boundaries of the field of view of the perspective display.

* * * * *